(12) United States Patent
Conrad et al.

(10) Patent No.: US 11,317,564 B2
(45) Date of Patent: May 3, 2022

(54) ELECTRIC MOWER APPARATUS AND METHOD OF USE

(71) Applicant: Mean Green Products, LLC, Hamilton, OH (US)

(72) Inventors: Joseph C. Conrad, Okeana, OH (US); Matthew C. Conrad, Okeana, OH (US)

(73) Assignee: Generac Power Systems, Inc., Waukesha, WI (US)

( * ) Notice: Subject to any disclaimer, the term of this patent is extended or adjusted under 35 U.S.C. 154(b) by 506 days.

(21) Appl. No.: 16/175,290

(22) Filed: Oct. 30, 2018

(65) Prior Publication Data

US 2019/0059227 A1  Feb. 28, 2019

Related U.S. Application Data

(63) Continuation of application No. 14/985,661, filed on Dec. 31, 2015, now Pat. No. 10,130,037.

(60) Provisional application No. 62/098,445, filed on Dec. 31, 2014.

(51) Int. Cl.
| | |
|---|---|
| *A01D 69/02* | (2006.01) |
| *A01D 34/78* | (2006.01) |
| *A01D 34/00* | (2006.01) |
| *A01D 34/66* | (2006.01) |

(52) U.S. Cl.
CPC ........... *A01D 69/02* (2013.01); *A01D 34/006* (2013.01); *A01D 34/66* (2013.01); *A01D 34/78* (2013.01)

(58) Field of Classification Search
CPC .. A01D 369/002; A01D 34/006; A01D 34/66; A01D 34/78; A01D 369/02
See application file for complete search history.

(56) References Cited

U.S. PATENT DOCUMENTS

| | | | |
|---|---|---|---|
| 4,866,320 A | 9/1989 | Schultz | |
| 4,969,102 A | 11/1990 | Tamura | |
| 5,007,234 A | 4/1991 | Sharman | |
| 5,406,778 A | 4/1995 | Lamb et al. | |
| 5,502,957 A | 4/1996 | Robertson | |

(Continued)

FOREIGN PATENT DOCUMENTS

WO  2016109860  7/2016

OTHER PUBLICATIONS

Search Report for Application No. WO 2016/109860 dated May 2, 2016.

*Primary Examiner* — Alicia Torres

(74) *Attorney, Agent, or Firm* — James A. Joyce; Godfrey & Kahn, S.C.

(57) ABSTRACT

A battery-operated mower is provided that includes a chassis supporting a first drive wheel and a second drive wheel, a battery pack, a first electric drive wheel motor interconnected to the first drive wheel and second electric drive wheel motor interconnected to the second drive wheel; one or more electric blade motors; an electric cooling fan in fluid communication with at least one of the first electric drive wheel motor and second electric drive wheel motor; one or more controllers for controlling the rotational speed of the first electric drive wheel motor, the second electric drive wheel motor, and the blade motors; and a left control actuator in communication with a first throttle sensor and a right control actuator in communication with a second throttle sensor, wherein the first throttle sensor and second throttle sensor are in communication with the one or more controllers.

1 Claim, 13 Drawing Sheets

(56) References Cited

U.S. PATENT DOCUMENTS

| | | |
|---|---|---|
| 6,339,916 B1 | 1/2002 | Benson |
| 8,880,300 B2 | 11/2014 | Gamble et al. |
| 2004/0135373 A1 | 7/2004 | Osborne |
| 2006/0059879 A1 | 3/2006 | Edmond |
| 2008/0086997 A1 | 4/2008 | Lucas |
| 2009/0096178 A1 | 4/2009 | Beal |
| 2010/0236845 A1 | 9/2010 | Ishii |
| 2012/0061153 A1 | 3/2012 | Porter |
| 2012/0227368 A1 | 9/2012 | Koike |
| 2012/0265391 A1 | 10/2012 | Letsky |
| 2013/0268165 A1 | 10/2013 | Hashima |
| 2014/0067172 A1 | 3/2014 | Harris, III |
| 2014/0102062 A1 | 4/2014 | Sandin et al. |

ELECTRIC MOWER APPARATUS AND METHOD OF USE

CROSS-REFERENCE TO RELATED APPLICATIONS

This application is a continuation of U.S. application Ser. No. 14/985,661 filed on Dec. 31, 2015, which claims the benefit of and priority to U.S. Provisional Patent Application No. 62/098,445 filed on Dec. 31, 2014 entitled "Commercial Electric Zero Turn Mower With Ride-on Capability," the disclosures of which are incorporated herein by reference in their entirety for all purposes.

FIELD

The electric mower apparatus and method of use relate to machinery for lawn care.

BACKGROUND

Gasoline mowers have been used extensively to address lawn care needs. Unfortunately, gasoline mowers have numerous disadvantages. More particularly, internal combustion engines produce significant emissions and pollutants into the air. In addition, they require several fluids to operate, which over time, can result in a leakage of harmful fluids into the environment. Further, internal combustion engines require mechanisms, such as a choke to address cold-starts.

Electric mowers have been introduced to address many of these issues. Unfortunately, current electric mower designs include numerous disadvantages. More particularly, many require use of an AC voltage power cord, which severally limits their range. Other current electric mowers utilize batteries (e.g., lead acid, etc.) that have low power to weight ratios, do not maintain a near constant voltage throughout the duration of battery state of charge to provide consistent, rather than rapidly declining, mower performance. Such batteries also are prone to leaking acid and cannot sustain a charge when left unused for a prolonged period of time. Such batterers are often heavy and not configured to be removable except during replacement due to failure. As such, once the battery is depleted, the mower must be parked and the battery recharged before mowing can resume.

Other issues related to current electric mowers include overheating of the electric motors due to the ineffectiveness of shaft mounted mechanical cooling fans and overheating of other electronics utilized to operate the mower due to poor air flow. Current electric mowers also suffer from oversensitive steering controls, which provide "jerky" or abrupt steering responses, making the mower difficult and unpleasant to operate. Further, when operating current mowers under heavy load, such as when cutting thick grass, the cutting blades may not be able to spin fast enough to consistently cut the grass, this requires an operator to either mow the area again or to manually select a lower gear prior to cutting thick grass.

BRIEF SUMMARY

The above considerations, and others, are addressed by the electric mower apparatus described below, which can be understood by referring to the specification, drawings, and claims. The electric mower apparatus generally relates to a commercial electric ride-on mower which includes a main deck, control panel, chassis, battery pack, electronics bay, electric drive and blade motors, a cooling system, operator control dampening system, and load sensing drive speed control system. In at least some embodiments the electric mower apparatus is configured to provide a commercial electric zero turn mower with ride-on capability for fulfilling the need for a stable, quiet, easy to operate and maintain, commercial ride-on lawn mower that is powered by electric motors with mechanical gear reduction, independent electronics cooling, dampened operator controls, and a load sensing drive speed control system. Further, in at least some embodiments, the electric mower apparatus includes one or more of the following features: produces zero emissions and pollutants; requires no gas, oil, hydraulic fluid, battery water or acid, or spark plugs; operates immediately with the turn of a key or switch and requires no choking or warming up before operating; maintains a near constant voltage throughout the duration of battery state of charge to provide consistent, rather than rapidly declining mower performance; provides a Commercial Electric Zero Turn Mower with Ride-on Capability that has the ability to more safely traverse hills and slopes; contains safety devices such as operator presence switch, dual switch activation for blades, and blade movement stoppage within 3 seconds of operator presence lever release; can be easily recharged rapidly or overnight by grid power or be charged by alternate power such as wind and solar chargers; has a battery pack that can be permanently secured to the machine or a battery pack that can be secured inside a container that can be removed and exchanged with a freshly charged battery pack for extended use; has an independent cooling system that cools the electronics as well as the drive motors regardless if the drive motors are operating or not operating, allowing for all day commercial use; has electronic steering and drive speed control inputs from the operator that are mechanically dampened to cause smooth, consistent movements, these dampened movements can substantially duplicate the feel of hydraulic controls on standard internal combustion engine commercial mowers; monitors electric load inputs to the blade motors to visually display to the operator the varying current loads via lights or displays, these load inputs may also automatically vary the maximum speed of the drive system in order to keep the blade motors from becoming overloaded and shutting off; operates with heavy duty electric motors and mechanical gear reduction that can withstand over 1,500 lb GVW loads and over 20 degree slopes.

In at least some embodiment, the electric mower apparatus is directed to a battery-operated mower that includes: a chassis supporting a first drive wheel and a second drive wheel; an operator support interconnected to the chassis for supporting an operator; a battery pack supported by the chassis; a selectively engageable first electric drive wheel motor interconnected to the first drive wheel and a selectively engageable second electric drive wheel motor interconnected to the second drive wheel; one or more electric blade motors configured to secure respective cutting blades; an electric cooling fan in fluid communication with at least one of the first electric drive wheel motor and second electric drive wheel motor; one or more controllers for controlling the rotational speed of the first electric drive wheel motor, the second electric drive wheel motor, and the one or more electric blade motors; and a left control actuator in communication with a first throttle sensor and a right control actuator in communication with a second throttle sensor, wherein the first throttle sensor and second throttle sensor are in communication with the one or more controllers, and wherein signals received from the first throttle sensor and second throttle sensor are utilized for selectively engaging one or both of the first drive wheel and the second drive wheel to provide a varied steering response.

In at least some other embodiments, the electric mower apparatus is directed to a battery-operated mower that includes: a chassis supporting a first drive wheel and a second drive wheel; an operator support interconnected to the chassis for supporting an operator; a removable battery pack supported by the chassis; a selectively engageable first electric drive wheel motor interconnected to the first drive wheel and a selectively engageable second electric drive wheel motor interconnected to the second drive wheel; one or more electric blade motors configured to secure respective cutting blades; one or more controllers for controlling the rotational speed of the first electric drive wheel motor, the second electric drive motor, and the one or more electric blade motors, wherein the one or more controllers senses the power output to the one or more electric blade motors and reduces the power output to the first electric drive wheel motor and the second electric drive wheel motor when the power output sensed exceeds a pre-determined first high-load level, thereby decreasing the maximum travel speed of the mower; and a left control actuator in communication with a first throttle sensor, and a right control actuator in communication with a second throttle sensor, wherein the first throttle sensor and second throttle sensor are in communication with the one or more controllers, and wherein signals received from the first throttle sensor and second throttle sensor are utilized for selectively engaging one or both of the first drive wheel and the second drive wheel to provide a steering response.

In at least some further embodiments, the electric mower apparatus is directed to a battery-operated mower that includes: a chassis supporting a first drive wheel and a second drive wheel; an operator support interconnected to the chassis for supporting an operator; a battery pack; a selectively engageable first electric drive wheel motor interconnected to the first drive wheel and a selectively engageable second electric drive wheel motor interconnected to the second drive wheel; one or more electric blade motors configured to secure respective cutting blades; an electric cooling fan driven at a rotational speed that is independent of the rotational speed of the first electric drive wheel motor and the second electric drive motor; one or more air ducts configured to channel airflow from the electric cooling fan through air input portions of the first electric drive wheel motor and second electric drive wheel motor; one or more controllers for controlling the rotational speed of the first electric drive wheel motor, the second electric drive wheel motor, and one or more electric blade motors, wherein the one or more controllers sense the power output to the one or more electric blade motors and one of ceases or reduces power output to the first electric drive wheel motor and the second electric drive wheel motor when the sensed power output exceeds a pre-determined high-load level, thereby reducing the travel speed of the mower; a left control actuator in communication with a first throttle sensor and a right control actuator in communication with a second throttle sensor, wherein the first throttle sensor and second throttle sensor are in communication with the one or more controllers, and wherein signals received from the first throttle sensor and second throttle sensor are utilized for selectively engaging one or both of the first drive wheel and the second drive wheel to provide a varied steering response; a first hydraulic dampener engaged with the left control actuator to provide an increased resistance to movement during actuation of the left control actuator; and a second hydraulic dampener engaged with the right control actuator to provide an increased resistance to movement during actuation of the right control actuator, wherein the increased resistance to movement provides a dampened rate of change as sensed by the first and second throttle sensors during actuation of the actuators.

BRIEF DESCRIPTION OF THE DRAWINGS

Embodiments of the electric mower apparatus and method of use are disclosed with reference to the accompanying exemplary drawings, which are for illustrative purposes. Various portions of the apparatus may be omitted from illustration in one or more FIGS. in order to provide a view of underlying components. The electric mower apparatus and method of use are not limited in application to the details of construction or the arrangement of the components illustrated in the drawings. The electric mower apparatus and method of use are capable of other embodiments or of being practiced or carried out in various other ways. In the drawings.

DETAILED DESCRIPTION

Figure 1:
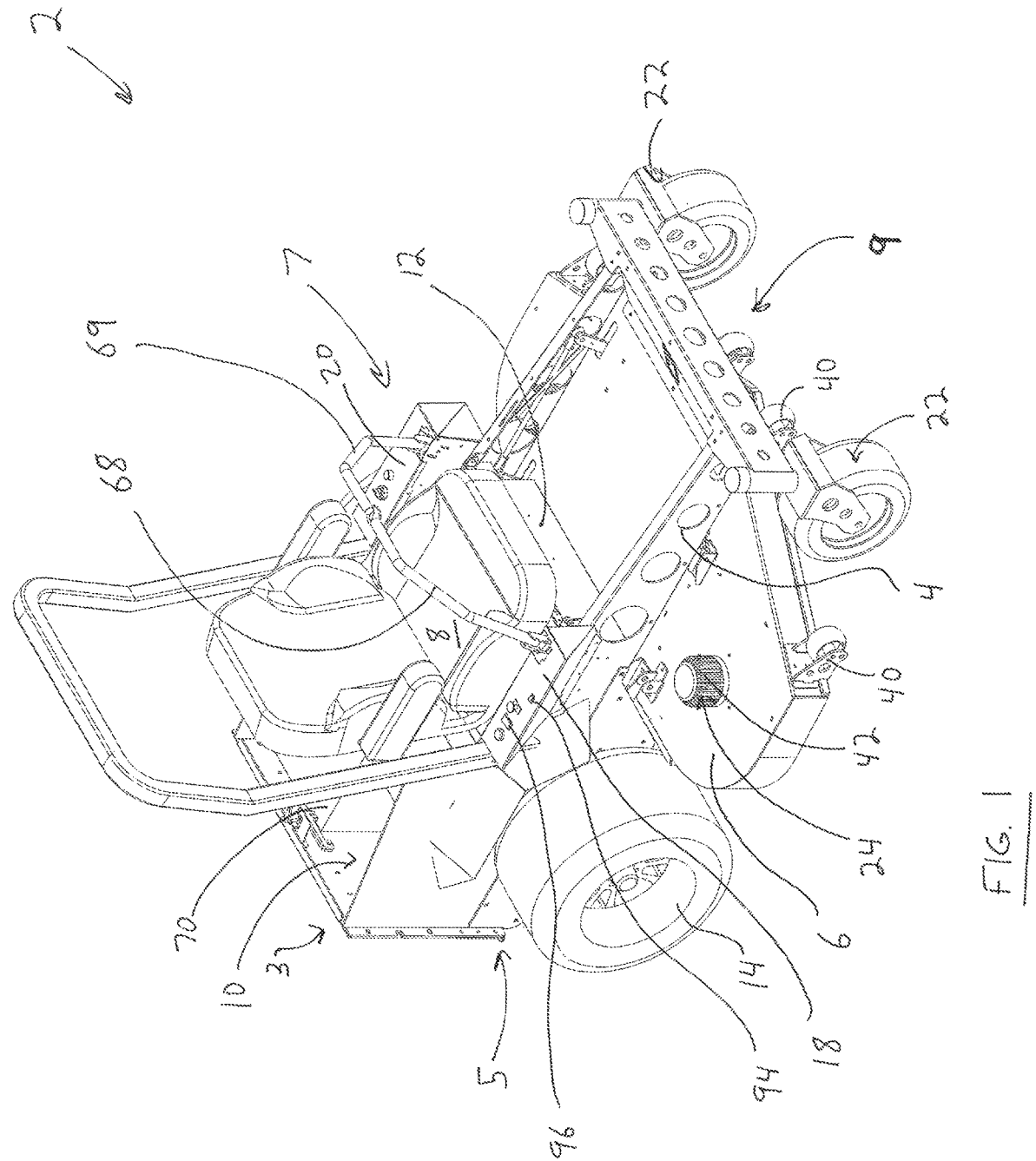
FIG. 1 illustrates a top front perspective view of an exemplary mower.
Figure 2:
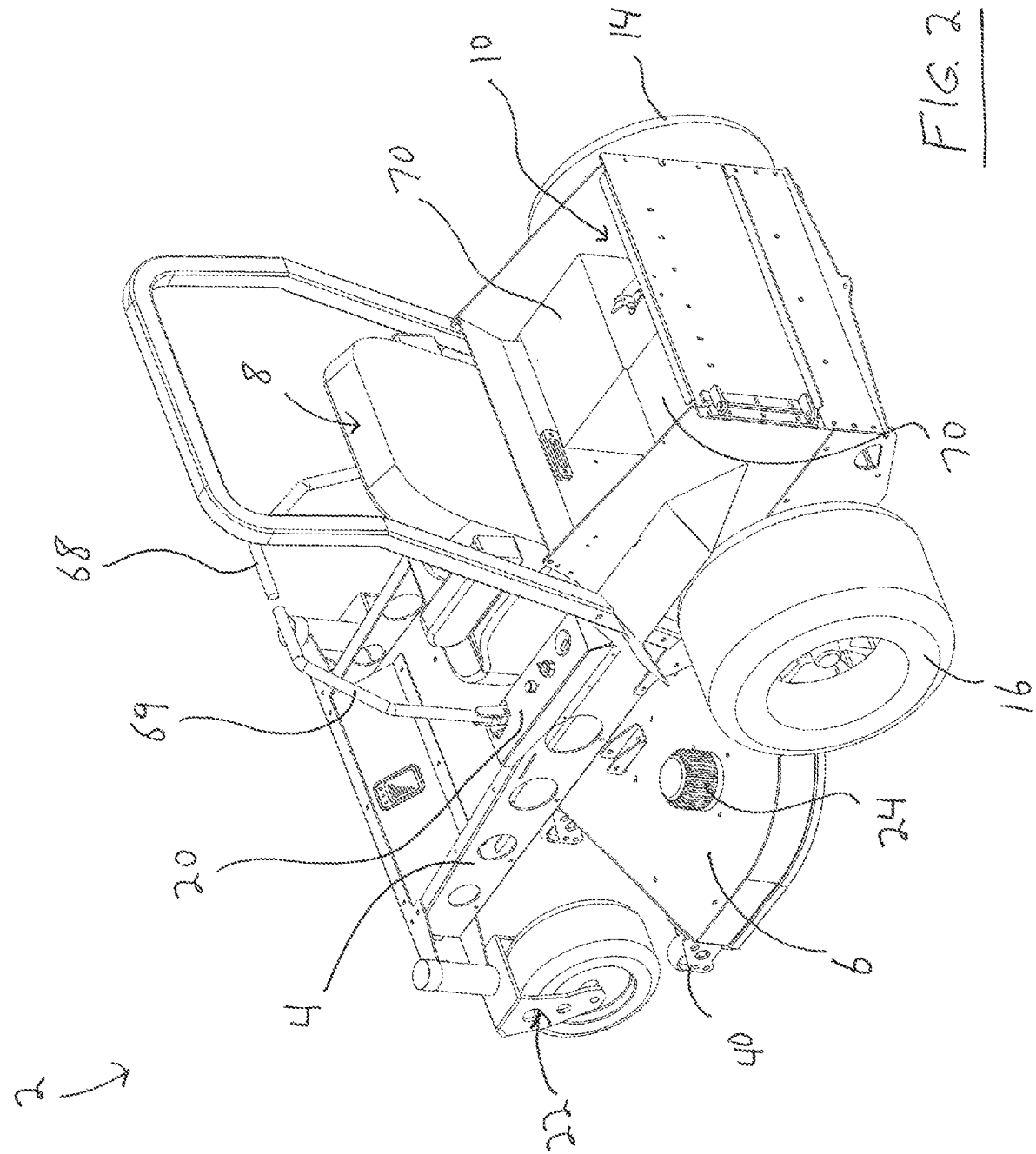
FIG. 2 illustrates a top rear perspective view of the mower of FIG. 1.
Figure 3:
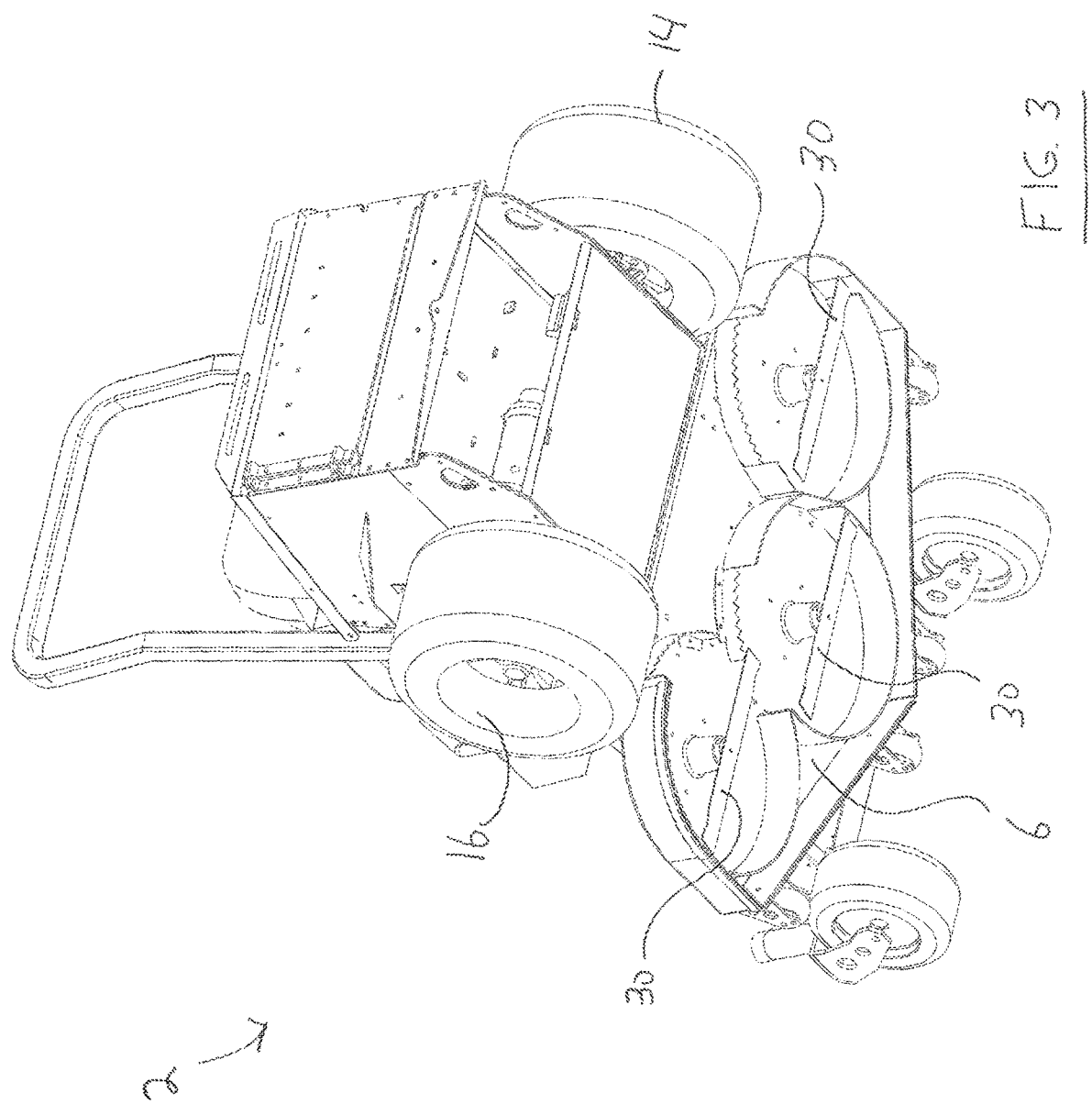
FIG. 3 illustrates a bottom rear perspective view of the mower of FIG. 1.
Figure 4:
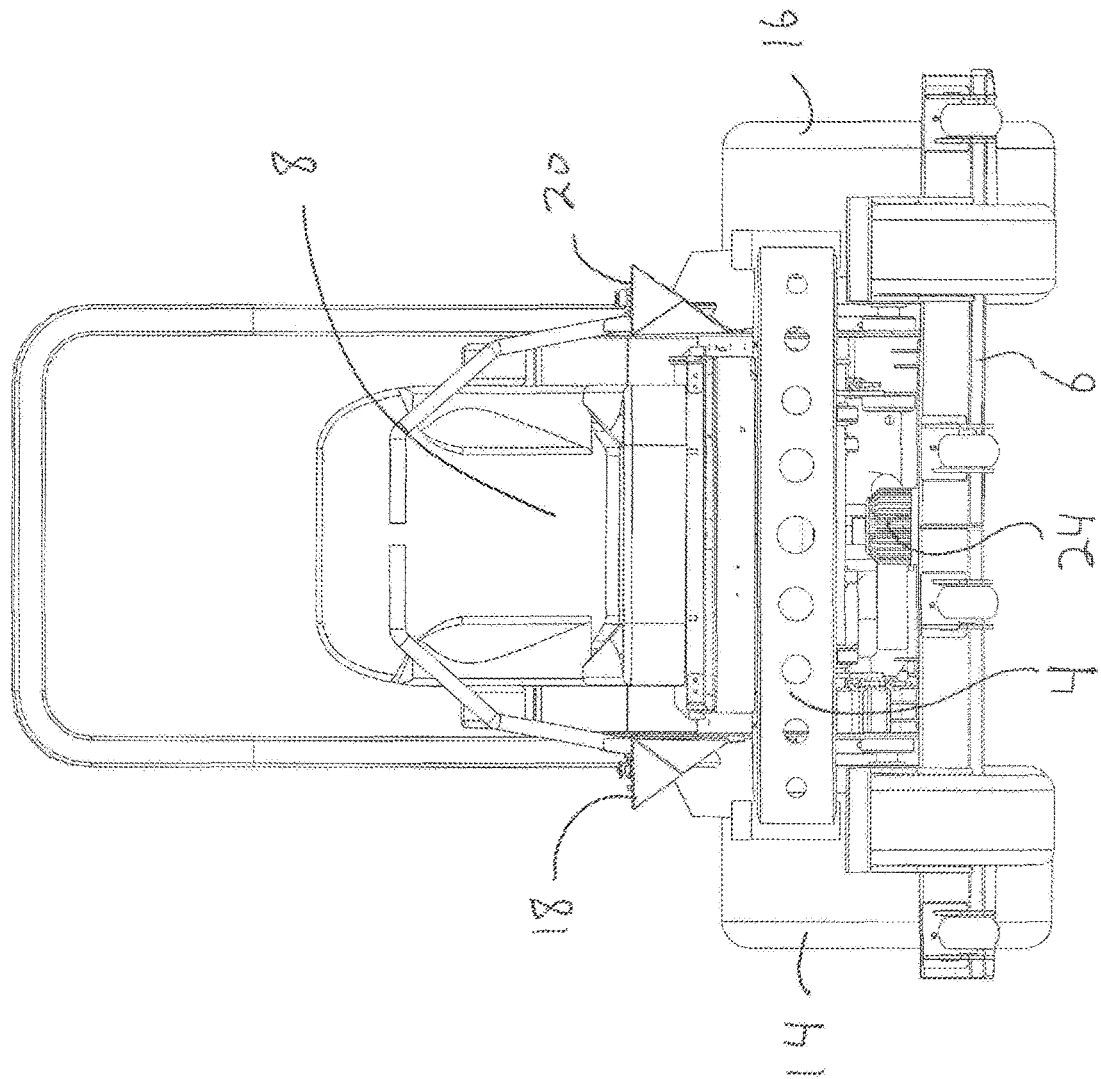
FIG. 4 illustrates a front elevation view of the mower of FIG. 1.
Figure 5:
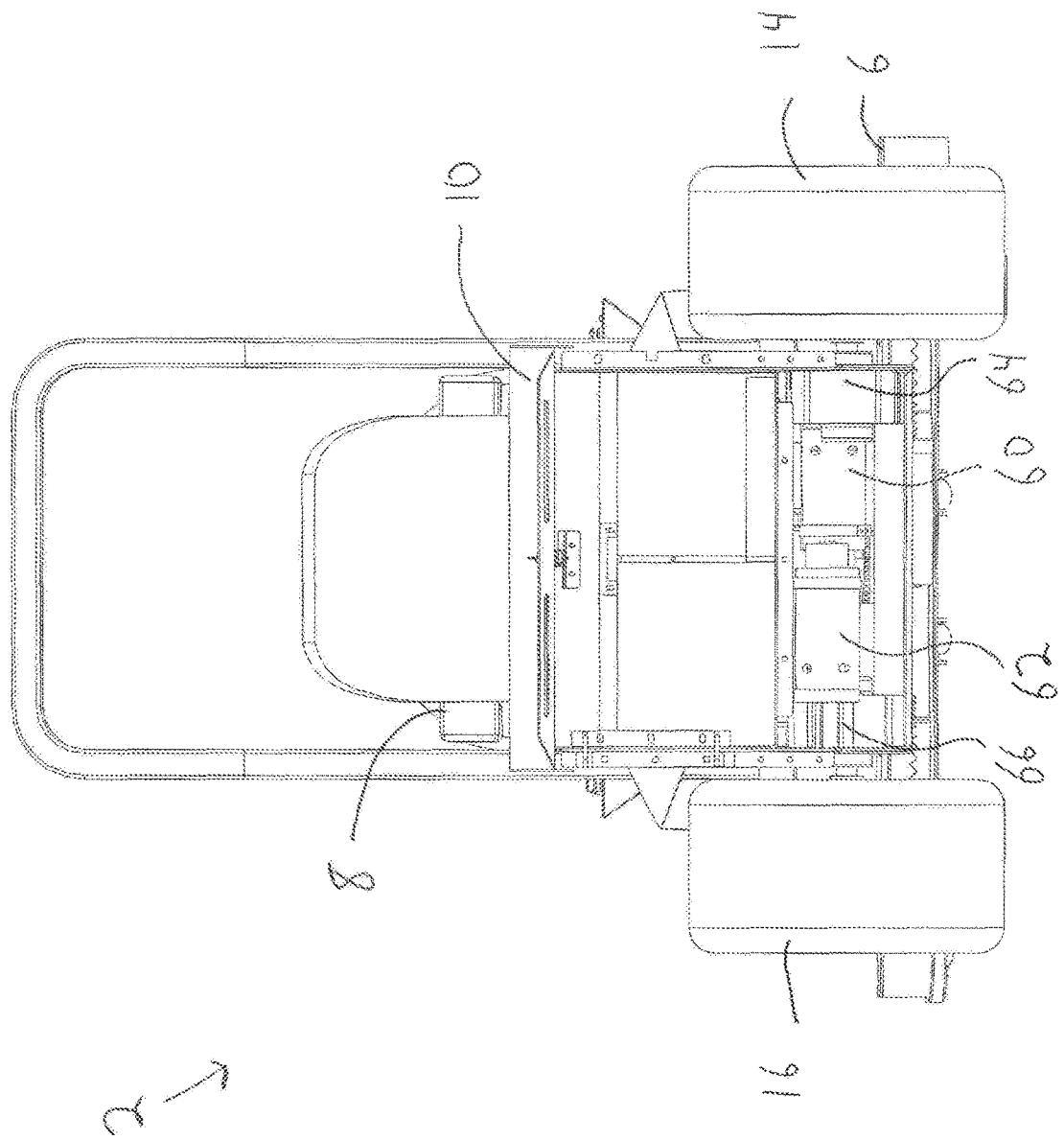
FIG. 5 illustrates a rear elevation view of the mower of FIG. 1.
Figure 6:
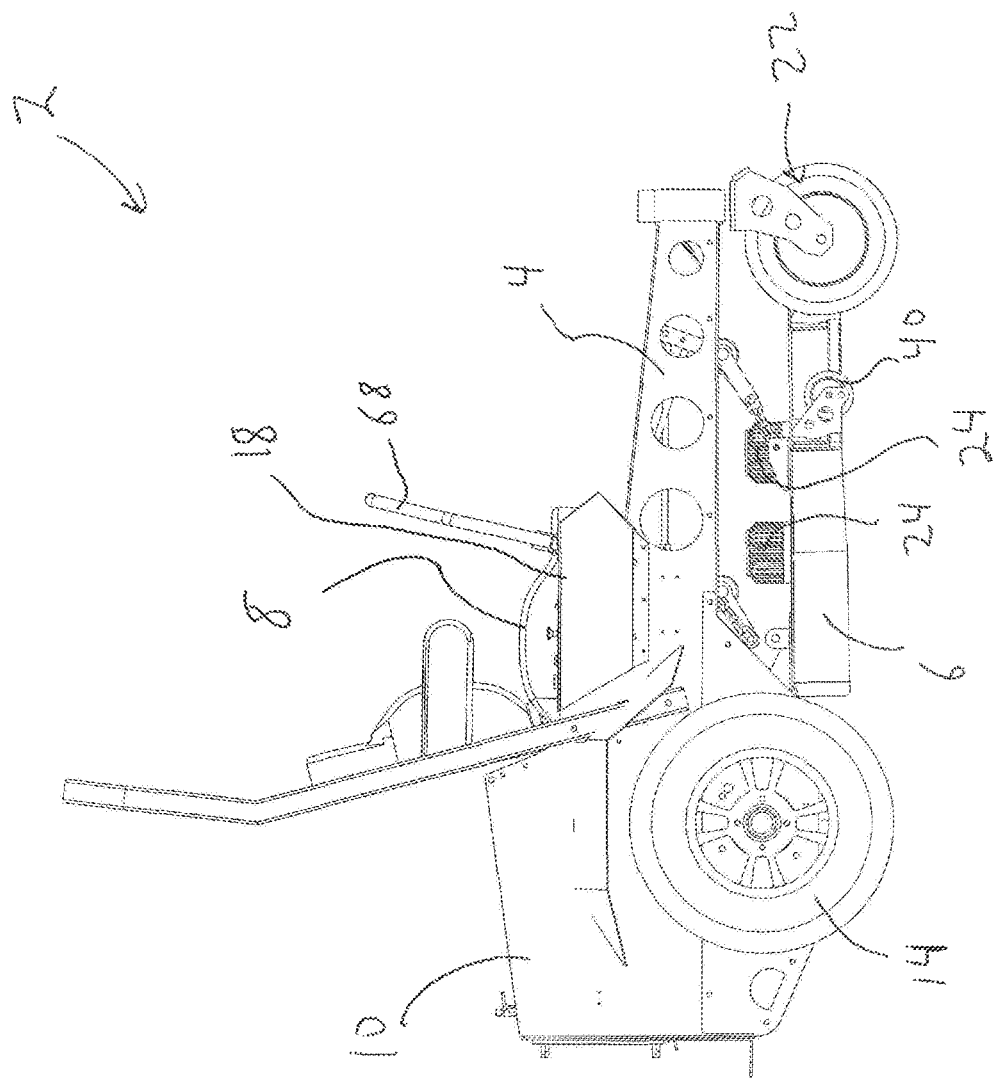
FIG. 6 illustrates a right side elevation view of the mower of FIG. 1.

Referring to FIGS. 1-10, numerous perspective and elevational views of a mower 2 are provided, as described above. The mower 2, includes a chassis 4 that consists of numerous structural members secured together to form a framework (i.e., a frame) for which to interconnect the components of the mower 2, including a mower deck 6, an operator support 8, a battery compartment 10, an electronics bay 12, a right drive wheel 14, a left drive wheel 16, a right side operator control panel 18, a left side operator control panel 20, and front support wheel assemblies 22 that each include a swivel mount and a wheel. The chassis 4 can be comprised of any of a number of structural materials including, but not limited to metals, alloys, composites, plastic, or any combination thereof capable of handling structural loads that the chassis 4 may endure. For reference, a rear 3, a right side 5, a left side 7, and a front 9 are identified in FIG. 1.

Figure 10:
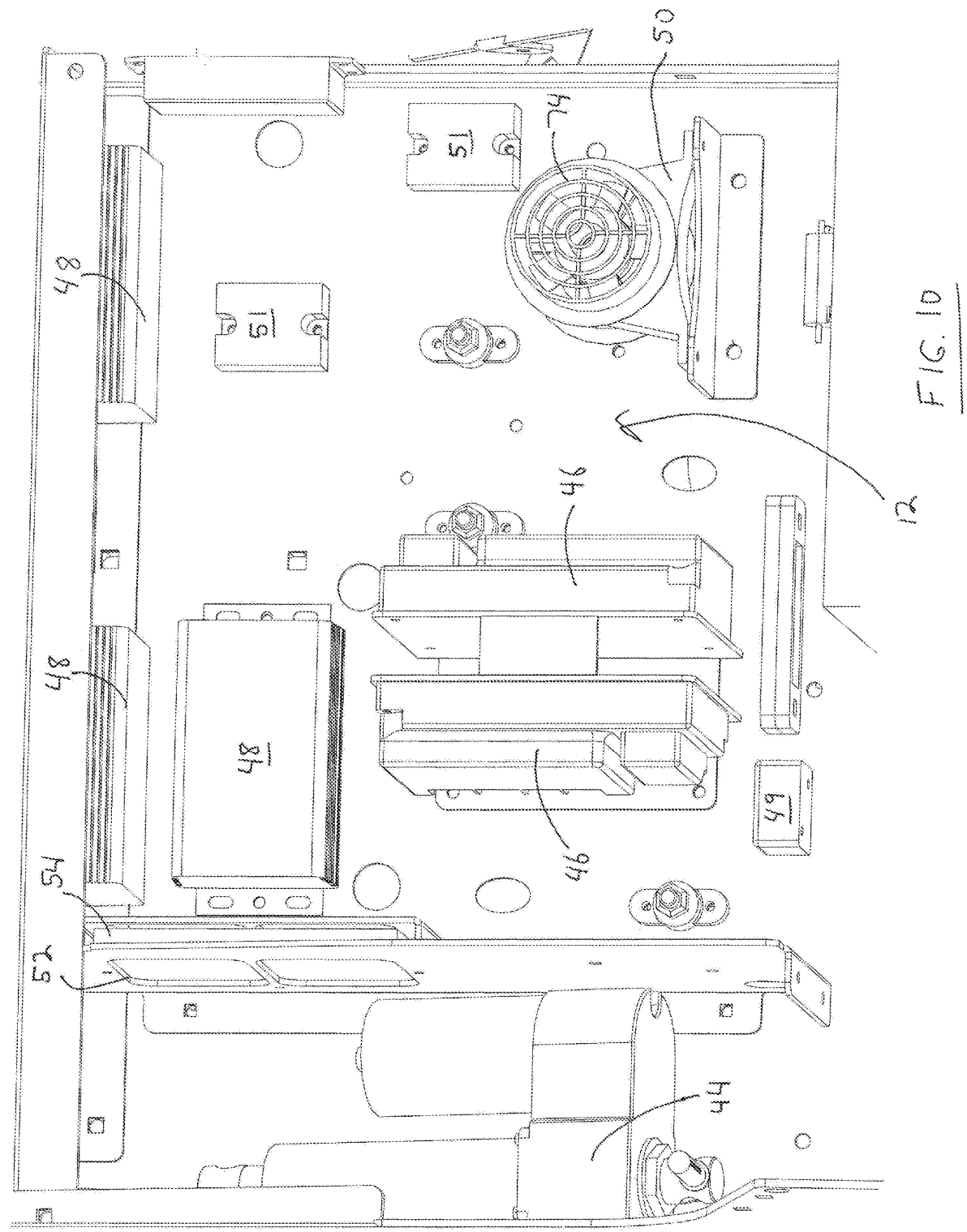
FIG. 10 illustrates a partial top view of the mower of FIG. 1 with various portions removed to show details of the electronics bay.

The deck 6 provides a sturdy structure for which to mount other components, such as a plurality of electric blade motors 24 having respective cutting blades 30, with each cutting blade secured to the output shaft of a respective blade motor. The blade motors 24 can operate in either clockwise or counter-clockwise direction and each include motor casings 42, which are shown protruding on top of the deck 6. The deck 6 also includes a plurality of free-wheel support rollers 40 for guidance along terrain. The deck 6 provides one or more grass discharge ports, which can be positioned on the right side, the left side, the rear, or otherwise configured for bagging or mulching grass. The height of the deck 6 can be adjusted manually or powered by an electric, hydraulic, or air driven device, such as a deck height linear actuator 44 (FIG. 10). In at least some embodiments, the deck 6 is constructed of 7-10 gauge steel or aluminum, while in other embodiments, the deck 6 can be constructed of any of a number of structural compounds including, but not limited to alloys, composites, plastic, or any combination thereof. The operator support 8 can be one of various types of supports, including a sitting chair, a standing pad, etc.

Referring to FIG. 10, in at least some embodiments, the electronics bay 12 can be positioned underneath the operator support 8. The electronics bay 12 is sized and shaped to house various electrical components, such as the deck height linear actuator 44, a plurality of drive wheel controllers 46, a plurality of cutting blade controllers 48, a fuse block 49, a cooling fan 50, a plurality of contactors 51, a bay air intake port 52, and an air inlet filter 54, although in other embodiments, one or more of these components can be located outside the electronics bay 12.

The drive wheel controllers 46 are configured to receive control signals and sensing signals, and to provide output power to a first electric drive wheel motor 60 (see FIGS. 9-10) and a second electric drive wheel motor 62, which in turn provide a steering response and travel speed for the mower 2. In at least some embodiments, the drive wheel controllers 46 are a Model No. PMT425S as manufactured by PG Drives Technology located in Christchurch Dorset BH23 4HD, United Kingdom. In at least some embodiments, the drive wheel motors 60, 62 are P/N 9D90-2100 as manufactured by ASI Technologies Inc. located in Montgomeryville, Pa. The first electric drive wheel motor 60 is mechanically coupled to the right drive wheel 14 via a first gear reduction axle 64, and the second electric drive wheel motor 62 is mechanically coupled to the left drive wheel 16 via a second gear reduction axle 66. The use of first and second drive wheel motors 60, 62 provides for zero turn drive capabilities by providing selective actuation of one or both drive wheel motors 60, 62. When the drive wheel controllers 46 are commanded to operate one or both drive wheel motors 60, 62, the mower 2 is propelled to a travel speed, either rotationally or linearly. Although the FIGS. depict the drive wheel motors 60, 62 interconnected with the drive wheels 14, 16, in at least some embodiments they can be mounted to other or additional drive wheels (not shown), as determined best for the function of power and speed. Further, additional electric drive motors can utilized as well. An overheat alarm annunciator 102 (FIG. 8) is interconnected with internal motor temperature sensors for each drive wheel motor 60, 62. The overheat alarm annunciator 102 provides visual and/or audio annunciation when the drive wheel motors 60, 62 are above a preset temperature.

The blade controllers 48 are interconnected with the blade motors 24. In at least some embodiments, a single blade controller 48 can be used to control multiple blade motors 24, while in other embodiments, multiple blade controllers 48 can be used, such as a single controller for each blade motor 24. The blade controllers 48 are configured to receive signals from one or more sensors, such as temperature sensors, blade speed sensors, a blade speed switch 94, etc., and provide power to the cutting blade motors 24 to adjust the speed of the cutting blades 30. Several of the sensors can be internally mounted in the blade motors 24, such as the temperature and speed sensors, and are therefore not illustrated (internally mounted speed and temperature sensors in an electric motor are known in the art). In at least some embodiments, the blade controllers 48 are a Model No. C12500-2 as manufactured by MAC Shanghai Brushless Motor CO., Ltd. located in Shanghai, China. In at least some embodiments, the blade motors 24 are a P/N M12500-2 as manufactured by MAC Shanghai Brushless Motor CO., Ltd. located in Shanghai, China.

Figure 7:
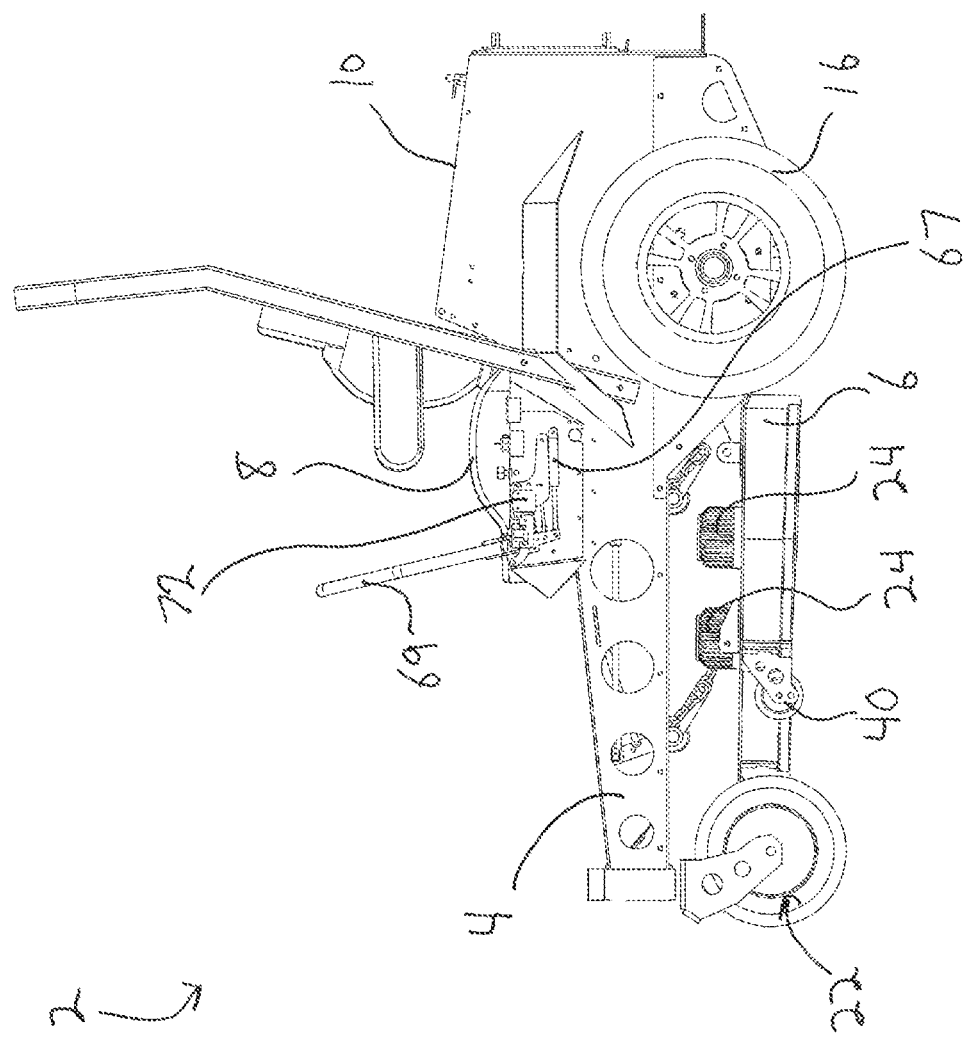
FIG. 7 illustrates a left side elevation view of the mower of FIG. 1.
Figure 12:
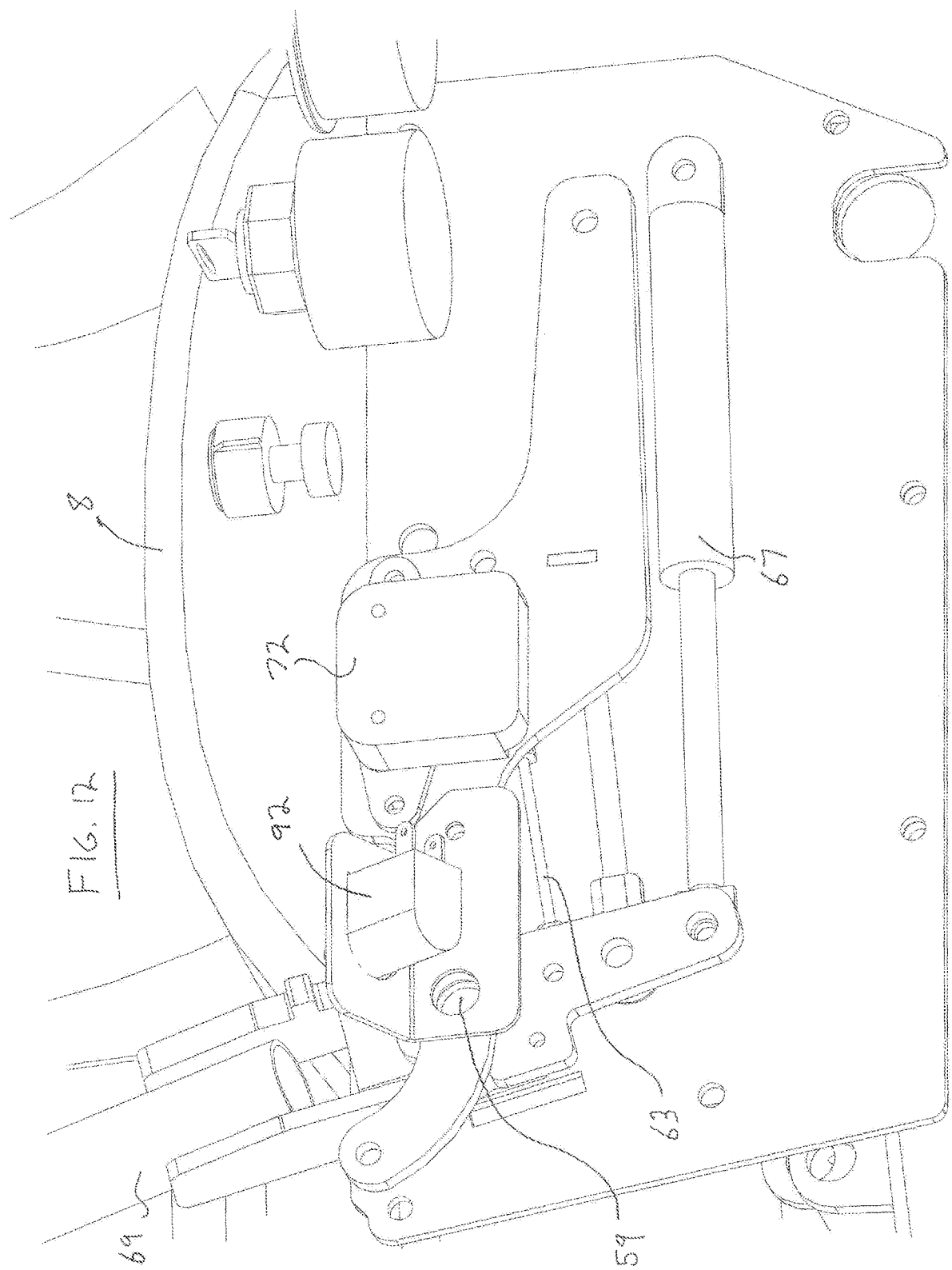
FIG. 12 illustrates a partial side view of the mower of FIG. 1 with various portions removed for clarity.
Figure 13:
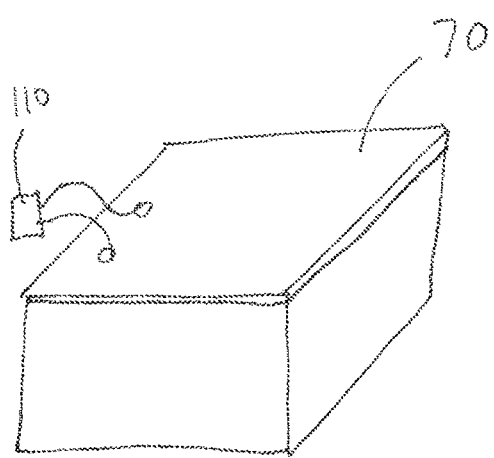
FIG. 13 illustrates a battery pack having a housing, a lid, and a cable connector.

Steering of the mower 2 is provided by one or more actuators operable by an operator to signal whether an operator desires to steer the mower 2 right or left. In at least some embodiments, the mower 2 includes a right control actuator 68 and a left control actuator 69. As illustrated, the actuators 68, 69 can be shaped as movable lap bars pivotably secured to the chassis 4, while in other embodiments, the actuators can take various other forms, including a single arm capable of actuation to the left or right, or a pair of foot operated actuators. A right throttle sensor is connected via a right linking rod 61, to the right control actuator 68 below a right pivot point 57. A left throttle sensor 72 is connected via a left linking rod 63, to the left control actuator 69 below a left pivot point 59 (FIG. 12). Although the right throttle sensor, right linking rod 61, right control actuator 68 and right pivot point 57 are not explicitly shown in detail, these right side components are mirror images of their left side counterparts as shown in FIGS. 7 and 12. The throttle sensors can each be connected to a separate drive wheel controller 46, thereby utilizing a single drive wheel controller 46 (such as a left drive wheel controller and a right drive wheel controller) and throttle sensor for each drive wheel motor 60, 62.

Movement of the right control actuator 68 forward or backward changes the right throttle sensor output, which is communicated to at least one of the drive wheel controllers 46 to either rotate the first drive wheel motor 60 forward or backward. Movement of the left control actuator 69 forward or backward modifies the left throttle sensor 72 output, which is communicated to least one of the drive wheel controllers 46 to either rotate the second drive wheel motor 62 forward or backward. If one of the control actuators 68, 69 are not actuated, while the other is actuated, one of the drive wheels 14, 16 will not rotate, thereby allowing for zero-turn capability.

The steering of the mower 2 is significantly enhanced over current electric mowers by the integration of a right hydraulic dampener 65 and a left hydraulic dampener 67 (FIGS. 7 and 12). Although the right hydraulic dampener 65 is not explicitly shown in detail, this right side component is a mirror image of the left side counterpart (left hydraulic dampener 67) as shown in FIGS. 7 and 12. Each dampeners 65, 67 is interconnected to a respective actuator 68, 69, such that movement of each actuator 68, 69 is dampened. More particularly, movement of the right control actuator 68 is dampened by the right hydraulic dampener 65, thereby reducing the rate of change as sensed by the right throttle sensor, which in turn provides a reduced rate in change of movement for the right drive wheel 14. In addition, movement of the left control actuator 69 is dampened by the left hydraulic dampener 67, thereby reducing the rate of change as sensed by the left throttle sensor 72, which in turn provides a reduced rate in change of movement for the left drive wheel 16. Without this dampening, sudden and abrupt movement of the actuators 68, 69, either intentional or unintentional (common in rough, off-road conditions that are typical for mowers), would result in a rapid rate of change in the throttle signals being sent to the drive wheel controllers 46 by the throttle sensors. These rapid rate of change throttle signals would then be translated by the drive controller 46 into rapid rate of change movement of the drive wheel motors 60, 62, causing erratic and abrupt steering and acceleration. Instead, as a result of the dampeners 65, 67, the throttle signals received by the drive wheel controllers 46 and subsequently by the drive wheel motors 60, 62, change at a slower rate, providing a smoother steering and acceleration response. Although the use of hydraulic dampeners have been described, other types of dampeners can be constructed of any type of material that will slow and smooth abrupt movements. In addition, in at least some embodiments, various types of dampeners can be used including, oil hydraulic, water hydraulic, and electronic dampening.

The drive wheel controllers 46 and the blade controllers 48 receive power from one or more battery packs 70 (FIGS. 1, 2, 13, 14) situated in the battery compartment 10. The battery compartment 10 is illustrated in a position on the mower 2 so as to create an ideal center of gravity for the entire mower 2, while in other embodiments, the battery compartment 10 can be moved vertically or horizontally along the chassis 4. For example, situating the battery compartment 10 lower and more towards the front in order to lower the center of gravity of the mower 2 to provide desired stability with certain angled terrain.

When more than one battery pack 70 is utilized, the battery packs 70 are electrically interconnected in the battery compartment 10 to supply their power jointly. The interconnection can be either a parallel or series connection. Each battery pack 70 can include one or more removable portions situated therein, each portion including one or more battery cells (not shown). The battery packs 70 can be modular allowing them to be easily replaceable with another battery pack having an identical size and shape. The battery packs 70 may or may not be situated in a readily accessible location. When the battery packs 70 are situated in a readily accessible battery compartment 10, such as illustrated herein, an operator can easily add multiple battery packs 70 to increase operating time or power. In addition, the accessibility of the battery packs 70 allows an operator to swap out a discharged battery pack 70 for a charged battery pack 70 and resume operation without having to wait for internal batteries to charge.

In at least some embodiments, the battery packs 70 are comprised of lithium-based battery cells, capable of maintaining a near constant voltage for the duration of their state of charge. Although in other embodiments, other battery packs 70 can be compromised of other types of battery cells, such as Nickel-based, Lead acid based, etc. When lithium-based, for example, the battery packs 70 require no fluid refills or maintenance. The battery packs can be designed to store enough power to operate the mower 2 for commercial all day operations on one charge.

Figure 9:
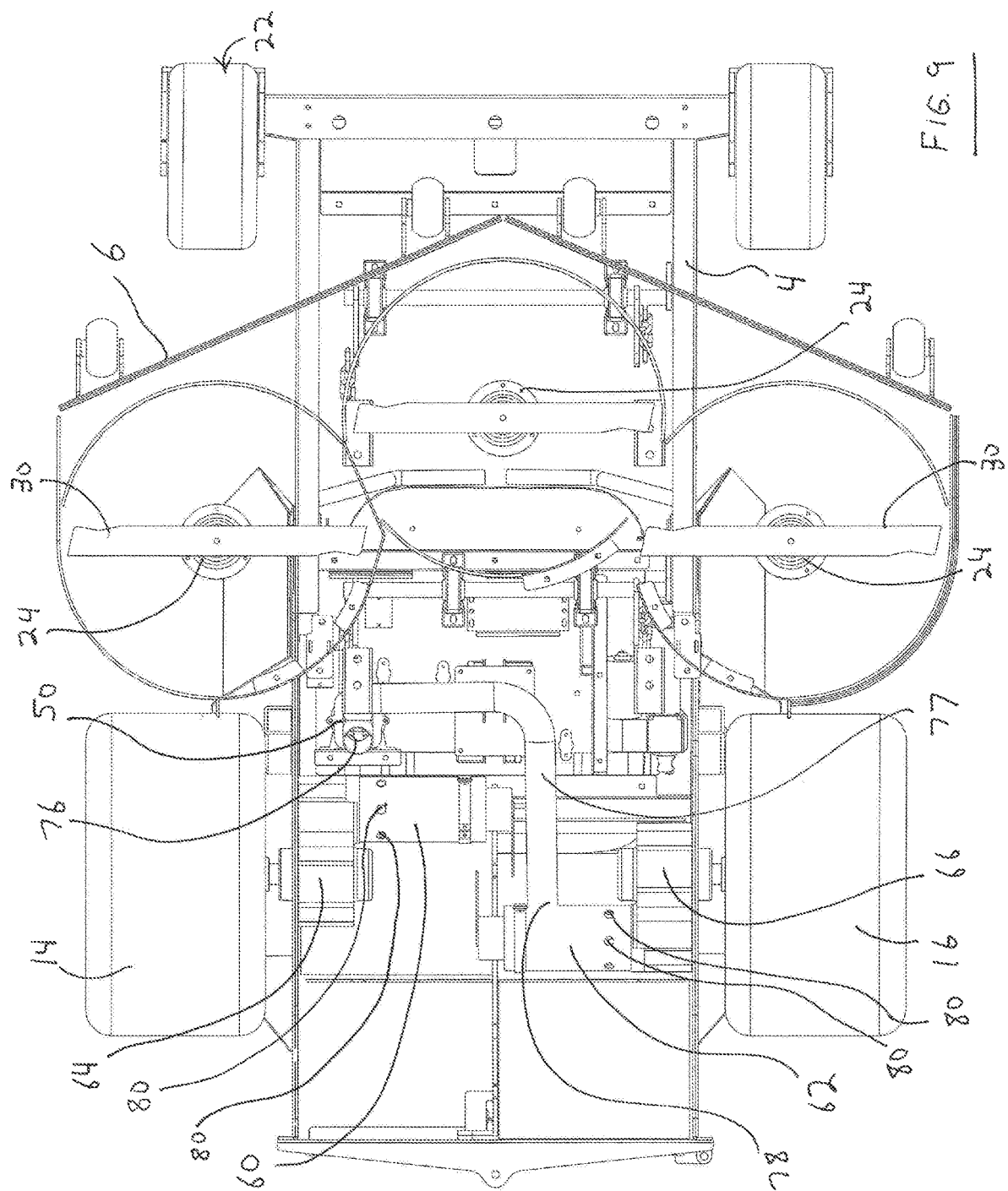
FIG. 9 illustrates a bottom view of the mower of FIG. 1.
Figure 11:
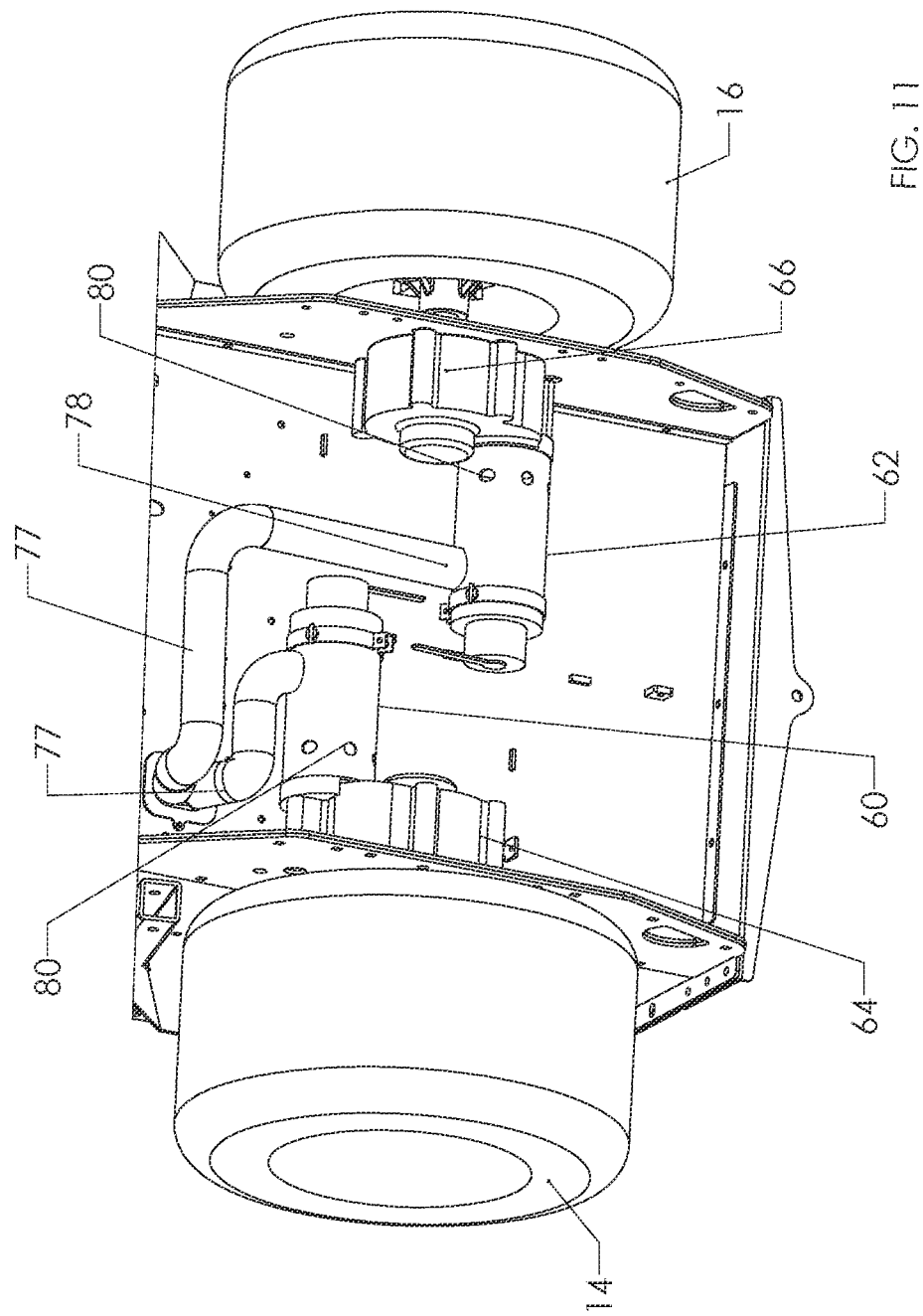
FIG. 11 illustrates a partial bottom view of the mower of FIG. 1 with various portions removed for clarity.

Referring to FIGS. 9-11, the mower 2 includes a cooling system designed to provide stabilized operating temperatures for the drive wheel motors 60, 62 to allow constant all day commercial use. The cooling system includes the independently operable cooling fan 50 having a cooling fan intake 74 (FIG. 10) that draws air through the air inlet filter 54 in the bay air intake port 52 and forces the air out of a cooling fan exhaust 76 (FIG. 9) on the bottom of the fan 50 and through a plurality of air ducts 77 directly into or around the drive wheel motors 60, 62. This described airflow arrangement has the benefit of cooling the many electrical components in the electronics bay 12 first before entering the cooling fan 50. In at least some embodiments, the plurality of air ducts 77 are positioned around portions of the drive wheel motors 60, 62, while in other embodiments, the plurality of air ducts 77 are connected directly to an air input portion 78 of each drive wheel motor such that hot air is expelled through an air output portion, such as a plurality of air exhaust holes 80 near an opposing end of the drive wheel motors 60, 62. Since the cooling fan 50 is independently operated through a power switch, the electronics bay 12 and drive wheel motors 60, 62 consistently have a strong, constant flow of ambient cooling air regardless of the speed of the drive wheel motors 60, 62. This operation is in contrast to a mechanical cooling fan that is integrally mounted on the motor itself, which only provides minimal cooling air when a motor is in operation, reduced cooling when the motor is rotating slowly, and no cooling when the motor is stopped. The cooling system can be constructed of any of numerous types of electric air moving devices and can draw intake air from either the drive wheel motor 60, 62 side or the bay air intake port 52, or from another area. The air ducts 77 can be configured in numerous shapes and sizes to provide sufficient air flow and to accommodate various manufacturing and design criteria to channel cooling air to numerous components of the mower 2.

Figure 8:
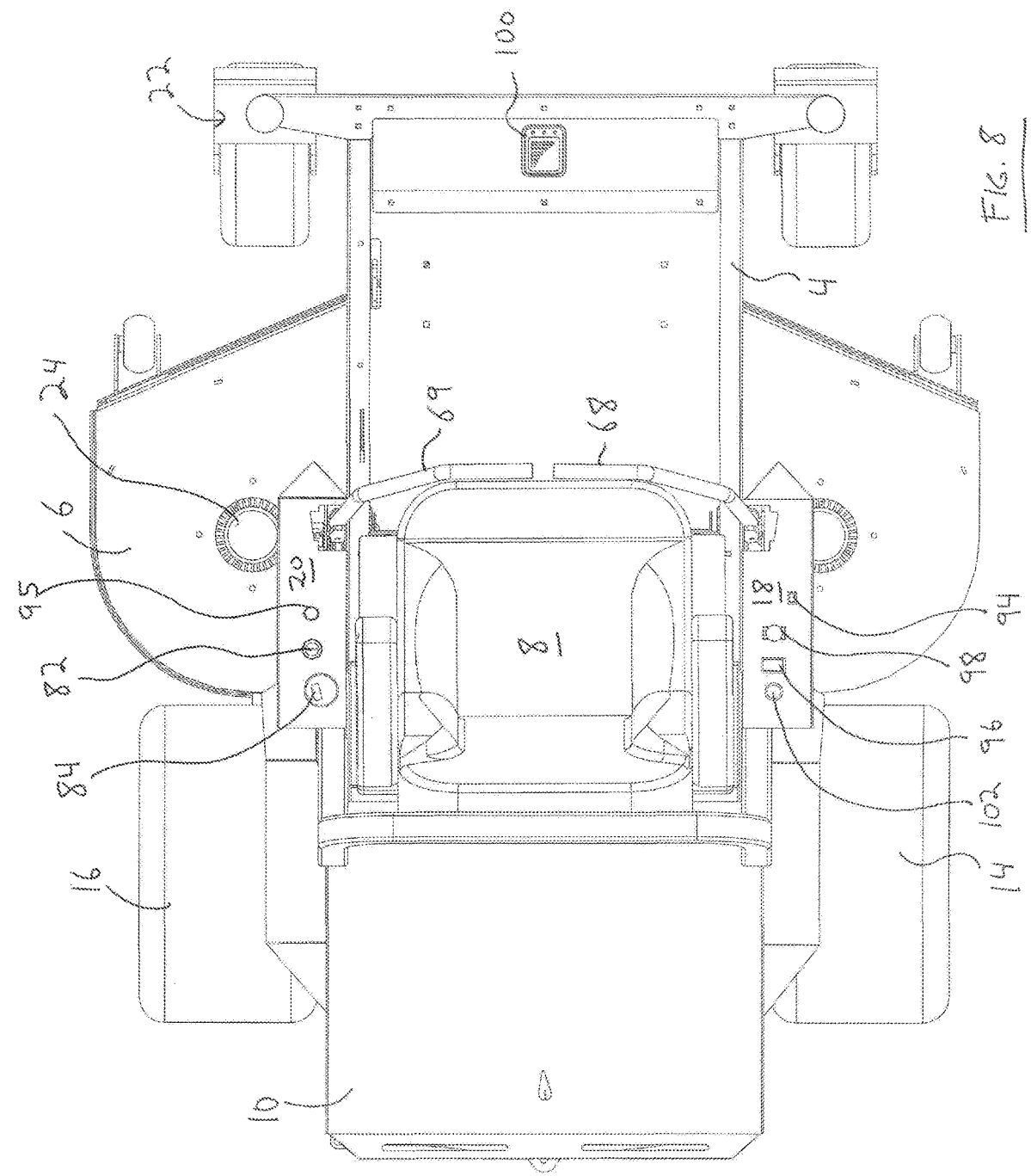
FIG. 8 illustrates a top view of the mower of FIG. 1.

Referring to FIG. 8, a top view of the mower 2 is provided that illustrates the right side operator control panel 18 and the left side operator control panel 20. The control panels 18, 20 can be configured to provide a plurality of operator actuatable controls and annunciators, for example controlling main power, engaging cutting blade operations, deck height adjustments, etc. In at least some embodiments, these control panels 18, 20 are located on each side of the operator support 8, within easy reach of an operator. The control panels 18, 20 provide a convenient means of operating all aspects of the mower 2 from one position. An ON/OFF key switch 82 on one of the control panels 18, 20 can be provided to connect power from the battery packs 70 to the electrical components in the electronics bay 12. An LED Power Indicator Light 84 can be illuminated when the key switch 82 is turned ON and the LED may turn off after the key switch 82 is turned OFF.

A right actuator safety switch 90 is interconnected with the right control actuator 68 and one or more associated drive wheel controllers 46, and a left actuator safety switch 92 is interconnected with the left control actuator 69 and one or more associated drive wheel controllers 46. In at least some embodiments, after the key switch 82 is turned ON, both actuators 68, 69 must be rotated inward by operator action to deactivate the safety switches 90, 92 before the drive wheel motors 60, 62 or blade motors 24 can be engaged by an operator. A Power-Take-Off (PTO) switch 98 (FIG. 8) is provided to signal to the drive wheel controllers 46 and blade controllers 48 that the operator plans to engage the drive wheel motors 60, 62 and/or blade motors 24. A speed control knob 95 is provided that allows an operator to select a desired travel speed. The speed control knob 95 is in communication with the drive wheel controllers 46. In at least some embodiments, the speed control knob 95 is a potentiometer.

The control panels 18, 20 can further include a "Hi" and "Lo" blade speed switch 94 (FIG. 1) that can be toggled to provide two different maximum speeds for the blade motors 24. The "Lo" setting provides slower blade rpm for more efficient mowing in lighter grass while the "Hi" position provides maximum power for thicker grass. In at least some embodiments, additional blade speed modes can be provided via other types of switches. The height of the deck 6 can be adjusted up and down by engaging a deck height switch 96 in either direction. The deck height switch 96 activates the deck height linear actuator 44 to raise or lower the deck 6. Any of the operating controls can be located at different areas of the control panels 18, 20 or other areas of the mower 2.

The mower 2 is configured to perform a load sensing automatic drive wheel and blade speed control process. By monitoring various parameters of the mower 2, the speed of the blade motors 24 and the drive wheel motors 60, 62, can be automatically adjusted during the mowing process to accommodate varying load conditions experienced by the mower 2. In at least some embodiments, the load sensing automatic drive wheel and blade speed control process utilizes several components, including a visual display unit 100 (FIG. 8), the blade controllers 48, the PTO blade switch 98, a blade speed switch 94 (FIG. 8), the speed control knob 95, and blade speed sensor, as discussed below.

Once the mower 2 has been activated with the intent to run the blade motors 24 (key switch 82 is ON and the PTO blade switch 98 is actuated), power is provided to each of the blade controllers 48. Once the blade controllers 48 send power to the blade motors 24, a current flow from the blade controllers 48 is established. The amount of current flowing from the blade controllers 48 to the blade motors 24 is monitored by the blade controllers 48, which subsequently provide a signal to the visual display unit 100, to display the current for the operator to view. The blade speed switch 94 can provide two functions, it can be used to disable the low speed function ("Hi" mode) or to initiate a lower speed signal for the blade motors 24 when the condition of a current load less than a pre-set value "A1" is recorded by the blade controller 48. When the blade speed switch 94 is set to "Lo" mode by the operator and a low current flow is sensed by the blade controllers 48, the blade controllers 48 can automatically reduce the maximum speed of the blade motors 24 to the "Lo" setting, until the current flow substantially increases, warranting a change back to the maximum speed established by the "Hi" speed setting. As the blade motors 24 encounter heavier cutting loads, the speed of the blade motors 24 can be monitored via a signal from the internal speed sensor associated with one or more of the blade motors 24. The speed of the blade motors 24 can be maintained by adjusting the current flow from the blade controllers 48 to the blade motors 24. The varying current flow that occurs while encountering heavier cutting loads is monitored inside the blade controllers 48. When the current flow reaches a pre-set high current flow of greater than a load value "A2", the blade controllers 48 will automatically send a signal to the drive wheel controllers 46 and the drive wheel motors 60, 62 will have their maximum speed reduced to a predetermined value "B1". After the speed reduction, the current load on the blade controllers 48 (from the blade motors 24) is again monitored. If the current load monitored by the blade controllers 48 is subsequently reduced below the load value "A2", the maximum speed of the drive wheel motors will be adjusted by the drive wheel controllers 46 back up to the original speed set by the operator, identified herein as "B2". If the current load increases to exceed load value "A2", the blade controller 48 will check to see if the current load exceeds a load value "A3". If the current load from the blade controller 48 exceeds load value "A3", the blade controllers 48 will reduce the maximum speed of the drive wheel motors 60, 62 further down to a drive speed "B3" via a signal to the drive wheel controller 46. If the load is reduced on the blade controllers 48, the drive speed is allowed to increase again to drive speed "B1". If the current load remains high and reaches a load value "A4", an alarm will sound on the display 100, the drive speed will remain slow at drive speed "B3", and the current load of the blade controllers 48, having a value of "A4", will be disconnected before damage can result to the blade controllers 48. The blade controllers 48 cannot be restarted until the PTO blade switch 98 is cycled "Off" and then back "ON". Then, the cycle can start over again.

Without this load sensing automatic drive and blade speed control process, the quality of a grass cutting can be greatly diminished due to reduced blade tip speed, excessive power efficiency losses due to constant high blade speeds that are unnecessary, and damage can occur to the blade motors 24 or blade controllers 48 due to continuous current overloading. Furthermore, less skilled operators can be utilized to operate the mower 2 due to the automated functions of the system.

Although the load sensing automatic drive and blade speed control process discussed above includes various preset levels (stages) for action to occur, in at least some embodiments, the process can be more linear. More particularly, the speed (or maximum or minimum speed) of the drive wheel motors 60, 62 can be continuously varied in response to the current load sensed by the blade controllers 48. In at least some embodiments, the speed of the drive wheel motors 60, 62 would be inversely proportional to the current load sensed by the blade controllers 48, with a higher current load resulting in a lower drive wheel motor speed, and a lower current load resulting in a higher drive wheel motor speed. In this manner, speed adjustments can be optimized to increase response time. To limit sudden rates of change to the speed of the drive wheel motors 60, 62, a buffering component can be provided to average the inputs current loads and provide an averaged output speed. In some embodiments this can be accomplished using a proportional-integral-derivative controller (PID controller) that includes a control loop feedback mechanism to provide less erratic (smooth) speed changes.

Similar to the drive wheel motors control discussed above, the blade motors 24 can also include a more linear process of control by continuous sensing of the current load at the blade controllers 48. In the case of the blade controllers 48, the relationship would not be inverse. More particularly, when the blade controllers 48 sense a reduction in current load (e.g., light grass), the blade controllers 48 can lower the speed of the blade motors 24 to save energy. When the blade controllers 48 sense an increase in current load (e.g., heavy grass), the blade controllers 48 can increase the speed of the blade motors 24 to provide sufficient cutting power. This speed adjustment can be direct based on the instantaneous current load, or averaged, or otherwise modified using feedback, such as described above for the drive wheel motors.

The general operation of the mower 2 can involve various hardware and software checks to ensure the safety of the operator. Operation of the mower 2 from the operator's perspective is generally straightforward. To use the mower 2, the operator checks the battery pack 70 in the battery compartment 10 to ensure that the battery pack 70 has been charged and properly connected. The operator then mounts the operator support 8 positioned between the control actuators 68, 69 with full view and reach of the control panels 18, 20. The operator then turns the key switch 82 "ON". The mower now has power as indicated on the LED power indicator light 84.

Next, the operator rotates the control actuators 68, 69 inward to engage the drive wheel motors 60, 62. After rotating the control actuators 68, 69 inward, the PTO blade switch 98 is actuated and the blade motors 24 are operational. The operator can push (or pull depending on configuration) on the control actuators 68, 69 for forward motion and pull for reverse motion. Once in motion, the operator can control the direction of the mower 2 by applying right or left force to the control actuators 68, 69. Since the front of the mower 2 is balanced for a light load, any degree of direction can be quickly obtained with light direction force on the control actuators 68, 69. The dampeners 65, 67 connected to respective control actuators 68, 69 will provide smooth, steady control of the drive wheels 14, 16. The maximum speed of the cutting blades 30 can be adjusted by the blade speed switch 94 or another device on the operator control panels 18, 20.

The mower can now be used for mowing grass. The drive wheel motors 60, 62 and electronics in the electronics bay 12 will stay cool due to the constant flow of air generated by the cooling fan 50. In the case that the mower 2 encounters unusually tall or thick grass, the power consumption will increase on the blade motors 24, which is annunciated by the lights or graphs on the visual display unit 100. An automatic signal will be sent to the drive wheel controllers 46 in order to slow down the drive wheel motors 60, 62 by limiting their maximum speed. When the power consumption subsequently decreases on the blade motors 24, the maximum speed of the drive wheels 14, 16 is returned to its original set value. In case of an emergency, the operator can move the control actuators 68, 69 back to a neutral position by not pushing or pulling the control actuators 68, and by rotating them outward, then automatically stops the cutting blades 30 and drive wheels 14, 16. When the mowing is completed or the blade motors 24 automatically shut down due to the sensing of a pre-determined low voltage at the blade controllers 48, the operator drives the mower 2 back to a charging source or installs a spare battery pack.

If necessary, and if the mower 2 is equipped with exchangeable battery packs 70, a battery pack exchange can be completed by the following process: On level ground, the operator turns the key switch 82 "OFF" and removes the key. Next, the operator disconnects the battery cable, via the battery connector 110 FIG. 13 by pulling the connector apart. After disengaging one or more battery pack security pins (not shown), the battery pack 70 is pulled out of the battery compartment 10. After installing a charged battery pack, replacing the security pins and reconnecting the battery cable, the mower is ready for mowing again. This procedure can be done over and over as necessary to mow the required amount of grass for that job. After all operations are complete, the operator positions the mower 2 and any extra battery packs, if applicable, near a charging source, such as a battery charger suitable for the type of battery used.

What has been described and illustrated herein is a preferred embodiment of the invention along with some of its variations. The terms, descriptions and FIGS. used herein are set forth by way of illustration only and are not meant as limitations. Those skilled in the art will recognize that many variations are possible within the spirit and scope of the invention in which all terms are meant in their broadest, reasonable sense unless otherwise indicated.

What is claimed is:

1. A battery-operated mower comprising:
a chassis supporting a first drive wheel and a second drive wheel;
an operator support interconnected to the chassis for supporting an operator;
a battery pack supported by the chassis;
a selectively engageable first electric drive wheel motor interconnected to the first drive wheel and a selectively engageable second electric drive wheel motor interconnected to the second drive wheel;
one or more electric blade motors configured to rotate respective cutting blades;
one or more controllers for controlling the rotational speed of the first electric drive wheel motor, the second electric drive wheel motor, and the one or more electric blade motors; and
at least one control actuator in communication with a throttle sensor, wherein the throttle sensor is in communication with the one or more controllers, and wherein signals received from the throttle sensor are utilized for selectively engaging one or both of the first drive wheel motor and the second drive wheel motor to provide a varied steering response,
wherein the one or more controllers receive a speed signal from the one or more electric blade motors and increases or decreases power supplied to the one or more electric blade motors to substantially maintain blade motor speed during the application of a lighter or heavier cutting load, and
wherein the one or more controllers senses the power output to the one or more electric blade motors and one of ceases or reduces the power output to the one or more electric blade motors when the sensed power output exceeds a pre-determined high-load level.

* * * * *